United States Patent [19]
Ringland

[11] 3,710,676
[45] Jan. 16, 1973

[54] SELF-DRILLING AND THREAD-FORMING SCREW

[75] Inventor: Kenneth D. Ringland, Keene, N.H.

[73] Assignee: Central Screw Company

[22] Filed: Nov. 18, 1971

[21] Appl. No.: 200,132

Related U.S. Application Data

[63] Continuation-in-part of Ser. No. 882,634, Dec. 5, 1969, abandoned.

[52] U.S. Cl. ................................................85/41
[51] Int. Cl. ............................................F16b 25/00
[58] Field of Search ............85/41, 47; 408/199, 279

[56] References Cited

UNITED STATES PATENTS

| | | | |
|---|---|---|---|
| 603,748 | 5/1898 | Thau | 408/199 |
| 2,391,396 | 12/1945 | Denison | 408/199 |
| 3,241,426 | 3/1966 | Gutshall | 85/47 |
| 3,288,015 | 11/1966 | Hanneman | 85/47 |
| 3,463,045 | 8/1969 | Prescott | 85/41 |

FOREIGN PATENTS OR APPLICATIONS

| | | | |
|---|---|---|---|
| 714,611 | 11/1931 | France | 408/199 |

Primary Examiner—Marion Parsons, Jr.
Attorney—Axel A. Hofgren et al.

[57] ABSTRACT

A fastener of the type having a drilling end followed by a thread forming part to form threads in the drilled hole, and secure itself into the threads thus formed. The drilling portion is of unique formation to provide cutting edges continuous across the drill end without the usual blank or web area in the center of the fastener.

7 Claims, 7 Drawing Figures

PATENTED JAN 16 1973
3,710,676
SHEET 1 OF 2
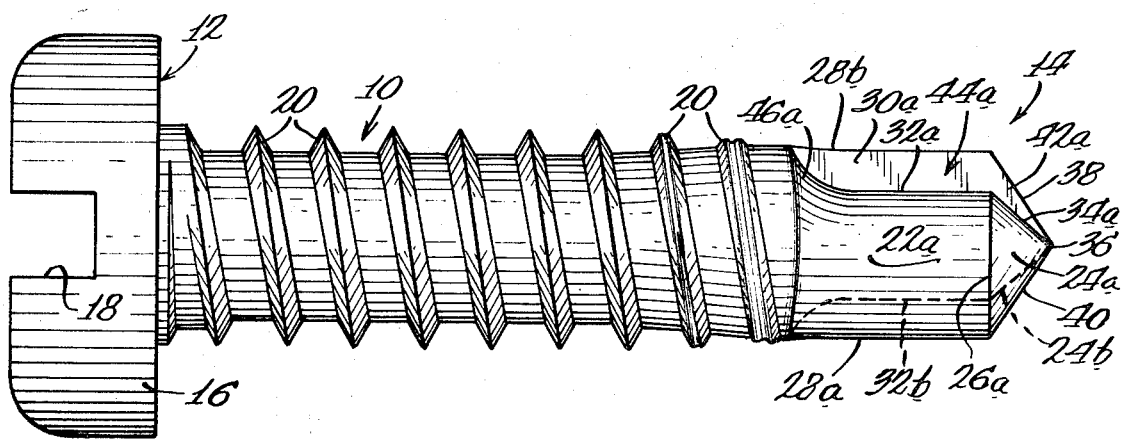
Fig. 1.
Fig. 2.
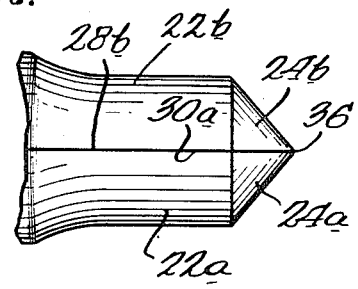
Fig. 3.
Fig. 4.
Inventor:
Kenneth D. Ringland
By Hofgren, Wegner,
Allen, Stellman & McCord Attys

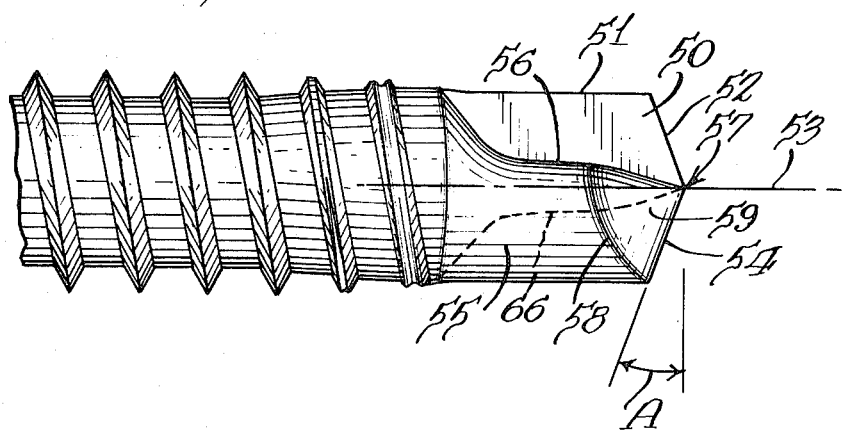
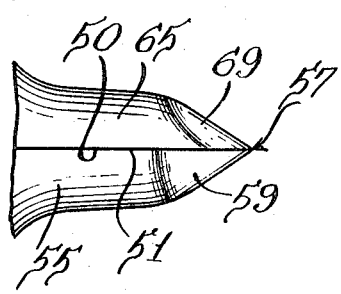
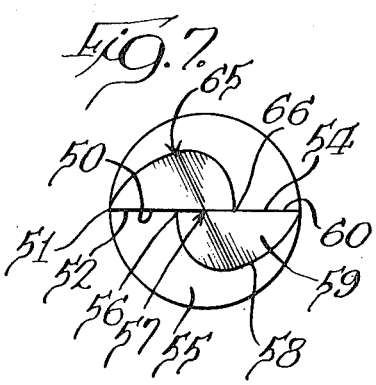

SELF-DRILLING AND THREAD-FORMING SCREW

This application is a continuation-in-part of my application Ser. No. 882,634 filed Dec. 5, 1969 now abandoned, and bearing the same title as this application.

BACKGROUND OF THE INVENTION

Self-drilling and thread forming screw fasteners have been increasingly employed in manufacturing operations in order to save time, labor, and expense. A fastener of the type described comprises basically a conventional headed screw having formed at its entering end, a drilling portion having drill-like end cutting surfaces. The drilling portion is so formed that it will cut into a workpiece when the screw is being turned thus drilling a hole into which the screw is anchored in one continuous motion. The threads that follow the drilling portion are self-forming or self-tapping. Therefore, by employing a self-drilling and thread forming screw, instead of drilling a hole for the screw, then tapping a screw thread in the hole, followed by securing the screw in the tapped hole, the operation is reduced to one step.

It has heretofore been the practice in the art to employ a formed drill point to comprise the drilling portion, e.g., the drilling portion can be merely a reduced facsimilie of an ordinary twist drill bit. Examples of prior art fasteners of the type described are disclosed in U. S. Pat. No. 3,079,831 issued Mar. 5, 1963, to C. E. Gutshall entitled "Screw Having Workpiece Drilling and Thread Cutting Point", and U.S. Pat. No. 3,125,923 issued Mar. 24, 1964, to W. M. Hanneman entitled "Screw". However, it has long been known in the metal working industry that there are certain disadvantages in using the conventional drill bit configuration.

All known drill bit configurations which require rotary motion to perform their function have a web or a dead area which does no actual cutting work (i.e. see U.S. Pat. No. 3,463,045). This area, or, web as it is called, is in the center of the forward cutting edges and only provides strength for the spaced drill cutting edges whether on twist drills or on drill point screws known today. Due to the area required for the web there have been many attempts to sharpen the web so that it would perform a cutting function. But these attempts have been for the most part futile. The web causes slow drilling or wandering of the drill point from its intended area of drilling as the dead area only drags or wears away the material to be drilled rather than freely cutting it.

When using a drill bit configuration on non-brittle materials, the drill chip is allowed to "string" or stay in long pieces. With high speed equipment as it is used today, these chips may become dangerous to the operator in that they spin with the drill point. The chip, in the instance of known drill point screws, is allowed to twist and turn with the screw and may damage or mar the face of the bearing surface of the article being assembled. In the event the chip is also left protruding from under the screw head and and if not removed, can cause injury to those using the manufactured article and give the appearance of poor workmanship.

Another well known fact in the use of drills and drill point screws is that unless they are held stable, as in heavy machinery, they may not start or locate themselves on a smooth surface. This is caused by the fact that the web does not provide cutting action at the center of the hole being drilled. Therefore, it has been necessary to make an impression with a punch or the like at the desired hole location before attempting to drill the hole. This is not only an extra operation but it is also detrimental to the finished surface of the workpiece.

It should also be noted that the angle in which the cutting edge is sharpened in a drill bit configuration can vary only slightly or else the web, which is only a centering device, will become off-center with the body of the drilling point. This causes the cutting edges to be longer on one side than on the other. As the web, which is off-center, "wears" its way into the material, the cutting edge that is longer rotates in a wider arc around the center. Thus, the hole may be drilled larger than intended and often times this is too large for its intended use.

Most drill point screws are intended for use but in a single assembly. The screw fastener is usually employed in assemblies in which the drilling portion is present only for the purpose of forming a hole into which the balance of the fastener may secure itself in one and the same operation utilized to drill the hole. The present drill point improvement has been found serviceable in multiple repeated assemblies, up to thirty such drillings and assemblies having been made with the same fastener, without materially changing the drilling speed, apparent efficacy of the drilling operation or the lack of wander of the drilling point due to the presence of the cutting edges continuous to the center line of the screw fastener.

SUMMARY OF THE INVENTION

The main object of this invention is to provide a drill screw of the kind described capable of drilling through tough materials to provide a suitable sized hole which is accurately located for its own installation. The screw has a new improved formed metal drilling portion having incorporated thereon at least two cutting edges which provide for cutting action continuously throughout the diameter of the drilling portion. The area behind the cutting edges known as the trailing body of the drilling portion is of such a length and shape so as to allow for chip clearance and relief. The drilling portion of the body is provided with a chip breaker structure to break the chips into small pieces and is so shaped that it can be integrally incorporated at the end of any thread cutting or thread forming screw.

The cutting edges of the screw converge to a point with no web between them thus providing cutting edges all the way to the apex of the point which is on the center line of the screw fastener. These cutting edges have proper clearances so as to allow for forward progression of the cutting action yet limit this progression in such a way so that the chip size will be controlled.

BRIEF DESCRIPTION OF THE DRAWINGS

FIG. 1 is an enlarged side elevation view of a drilling screw employing a drilling portion made according to the invention;

FIG. 2 is a fragmentary side elevational view of the drilling portion of the screw shown in FIG. 1, the view being at 90° to FIG. 1;

FIG. 3 is an end view of the drilling portion of the screw illustrated in FIG. 2;

FIG. 4 is a fragmentary perspective view of the drilling portion of a screw shown in FIG. 1;

FIG. 5 is an enlarged side elevational view of another embodiment of drilling screw employing a drilling portion made according to the invention;

FIG. 6 is a fragmentary side elevational view of the drilling portion of the screw shown in FIG. 5, the view being at 90° to FIG. 5; and FIG. 7 is an end view of the drilling portion of the screw illustrated in FIG. 6.

DESCRIPTION OF THE PREFERRED EMBODIMENT

An exemplary drill and thread forming screw embodying the invention is shown in FIG. 1 and is seen to comprise an elongated shank portion generally designated 10 having a head portion generally designated 12 integral with one end thereof and a drilling portion generally designated 14 integral with the other end of the shank 10. The head portion 12 is provided with a bearing surface 16 and a suitable slot 18 or other means for accommodating and cooperating with a tool (not shown) for turning the screw. Other such means may include a head portion configuration suitable for engagement with a mechanical rotary device such as an electrical screwdriver. The head may take various known forms and the screw may have captivated washers as is known in the fastener industry.

The shank 10 includes conventional helical thread convolutions 20 integrally formed on the surface thereof so that their inner or root diameter is similar to, i.e., equal or somewhat greater than, the diameter of the drilling portion 14. The threads 20 are roll formed on the shank 14 in the usual manner well known in the art. Part of these convolutions 20 immediately adjacent the drilling portion 14 may be of a progressively decreasing height so as to facilitate the entry of the threads 20 into an aperture drilled in a workpiece.

The drilling portion 14 is centered on the longitudinal axis or center line of the screw and has a relatively small hole forming diameter of proper size to receive the thread forming, cutting or swaging thread that follows. The drilling portion 14 is formed in the manner described in detail below so that it is provided with a pointed tip and cutting edges which enable it to drill through a blank workpiece.

In accordance with the invention, a headed blank or wire stock is initially formed or extruded into a suitable configuration. After the headed blank is provided in the suitable condition, the drilling portion 14 is pinched or cold forged between complementary dies (not shown) so as to impart the necessary structural features to the drilling portion. The dies are identically formed but oppositely disposed for presenting surfaces having a configuration described in greater detail below.

When the screw blank is pinched or forged between the oppositely disposed die elements, a pair of identical but oppositely disposed set of surfaces is provided on opposite sides of the drilling portion 14, i.e., the surfaces formed by one die are the same as the other surfaces formed by the other die which have been rotated 180° about the longitudinal axis of the screw. Understanding that the entire drilling portion 14 is a single mass forged from wire stock, all the surfaces and mass parts discussed in the specification will be referred to as parts or surfaces of solid bodies known in geometry as a convenience of description. Likewise, for ease of discussion, all those surfaces formed by one die will be designated by a numeral followed by the letter "a"; all those corresponding surfaces formed by the other die, will be designated by the same numeral followed by the letter "b".

As shown in FIG. 1, each side of the drilling portion 14 is defined by a rounded cylindrical surface 22a, whose axis is generally parallel to and offset from the longitudinal axis of the screw, surmounted by an oblique conical surface 24a having its apex on the longitudinal axis of the screw. The base of the conical surface 24a is on the cylindrical surface 22a, the surfaces being in effect joined at the line 26a. A side extremity surface 28a forms part of the cylindrical surface 22a. The distance between the two side extremity surfaces 28a and 28b at the forward end of the drilling portion determines the diameter of the hole to be drilled. The cylindrical surface 22a extends from the side extremity 28a around the drilling portion 14 terminating abruptly at and meeting a substantially flat exposed surface 30a along line 32a of intersection. The conical surface 24a likewise abruptly meets the exposed surface 30a along a line 34a. The cylindrical surface 22a and the conical surface 24a are formed with the exposed surface 30a so that they are substantially perpendicular at their meeting lines 32a and 34a.

The apex of the cone forms a pointed tip 36 of the drilling portion 14. Two cutting edges 38 and 40 extend generally radially from the tip 36 and are inclined rearwardly from the tip to the side extremity surfaces 28a and 28b. Even though the cutting edges 38 and 40 shown in the drawings are straight edges it should be understood that these edges may be other than straight, e.g. curved, just so long as the cutting edges 38 and 40 converge all the way to the tip 36 and extend all the way to the side of extremity surfaces 28a and 28b. Therefore, it can be appreciated that the exposed surfaces 30a and 30b adjacent the cutting edges 38 and 40 may be flat and radial relative to the longitudinal axis of the screw for providing straight cutting edges and curved slightly to form curved cutting edges. In either event, the exposed surfaces 30a and 30b will generally be orientated in a radial direction. It should be noted that since the cutting edges do converge all the way to the tip 36 there is no web between the opposing edges. The line 34a of intersection between the conical surface 24a and the exposed surface 30a leaves that portion of the exposed surface 42a immediately adjacent the cutting edge 38 exposed to the material to be cut when the screw is rotated (clockwise as viewed from the head end). This cutting surface 42a is all along the edge 38 from the outer extremity of the drilling portion 14 to the tip 36 of the screw. The surface 42b (FIG. 3) is likewise presented to the material to be cut immediately below edge 40 from the side extremity to the tip 36 so that the two edges 38 and 40 and their cutting surfaces 42a and 42b together provide a continuous cutting action across the end of the drill portion 14.

Each cutting edge 38 and 40 is adequately supported by the metal mass of the drilling portion 14 behind the respective edge. The mass having the conical surfaces and the cylindrical surfaces described provides the requisite strength and support for the cutting edges. The metal mass of the drilling portion 14 is not only employed for supporting the cutting edges 38 and 40 while leaving the cutting surfaces 42a and 42b exposed to cut into a workpiece, but also provides proper relief for forward progression of the cutting edges in the workpiece.

When the screw blank is pinched or forged between the oppositely disposed die elements, a pair of identical but oppositely disposed pockets generally designated 44a and 44b are provided in opposite sides of the drilling portion 14. As shown in the drawings, each of the pockets 44a and 44b is defined by the meeting of the cylindrical surface 22a with the exposed surface 30a. These pockets 44a and 44b extend rearwardly from the cutting edges 38 and 40 along lines 32a and 34a (32b and 34b) so as to provide for chip clearance and for directing the chips away from the cutting edges. As mentioned, the curved surfaces meet the flat surfaces along lines 32a and 32b at about 90° so that chips moving inward hit the curved wall and break. The cylindrical surface 22a is enlarged toward the full size of the shank portion 10 in the area 46a providing a directional change for the broken chips moving toward the shank portion 10. This directional change is provided so that chips traveling up the pocket 44a will exit the drill hole and pass outwardly from under the fastener head when forced into this directional change.

Referring particularly to the modification shown in FIGS. 5, 6 and 7, some variation in the cylindrical and conical surfaces referred to in connection with FIG. 1, is quite possible and sometimes beneficial in drilling through materials in which it is desirable to develop the full diameter of the drill hole sooner. In the embodiment of FIGS. 5-7, a flat exposed surface 50 ends in the side edge 51 and a radially extending cutting edge 52 continuous from the edge 51 to the center line 53 of the fastener. The fastener penetrating end is shown as having a much blunter overall appearance than that of FIG. 1. In this form, the angle A can be from 15° to 25° (that shown being 20°) so that the included angle between the cutting edge 52 and its complementary cutting edge 54 would be 160°. It is contemplated that many fasteners can be made where this included angle would be from 120° to 150°.

In the FIG. 1 drilling portion of the fastener, the metal mass including surface 22a is spoken of as a halfcylinder. Other shapes may be employed. The corresponding portion 55 in FIG. 5 is rounded in the nature of a cylinder but is of changing radii so that any horizontal section would produce a curve on the surface 55 (or 65) of involute or spiral shape. At the intersection 56 (or 66) of this surface 55 (or 65) with the flat surface 50 (or 60) there is an abrupt corner which serves to break up any chips flowing from the cutting edge 52 or 51, it being understood that most of the cutting occurs along the edge 52, which chips would be broken before moving up the channel toward exit from the drilled hole.

The conical end portion of the metal backing up the flat cutting surface is a cone whose center line is not parallel to the center line of the screw but is a rather oblique cone whose center line would be extending from the apex 57 of the fastener downwardly and to the left diverging from the center line as viewed in FIG. 5. A slightly visible line 58 generally indicates the juncture between the involuted surface 55 of the body of metal back of the cutting edge 54 and the conical surface 59 joining the surface 55 to the apex 57. A similarly shaped conical surface 69 is on a body of metal back of cutting edge 52.

In the form of FIG. 5, like the forms of FIGS. 1-4, there is absolutely no web or dead area at the center of the drilling portion. This fastener has a drill point which penetrates to the full diameter rapidly and exposes a large flat surface area, designated 50 and 60, the extremities of which form the drilling edges 52 and 54. These edges are likewise in a straight line across the full width of the drilling point being part of the exposed surfaces on either side of the apex. Each surface 50 and 60 is exposed 180° to the other such exposure extending directly to the center line of the fastener so that the change from one direction of exposure to the opposite occurs precisely at the center line and apex of the penetrating end.

Each mass of metal behind a cutting edge is similarly shaped in the pinching dies and may vary in the shape of its outer surface. Generally the curved surface 55 or 65 extends abruptly away from the flat exposed surface and then curls outwardly toward the side extremity of the penetrating end. Cross-sections taken perpendicular to the center line and through the drilling section of the fastener may produce circular outer surface profiles (FIG. 1) or involute or spiral profiles (FIG. 5). The length of the drilling section may be varied to suit the thickness of the material being drilled, being longer for thicker materials to insure chip escape from the drilled hole. Profiles may vary along the length of the drilling section, changing in size and in shape if desired for strength, metal flow in the pinching dies or other dictates of manufacturing convenience.

When applying the screw to a work structure, the screw member is forced against a blank workpiece and turned by means of any suitable tool. During the initial phase of this operation, the projecting point of the tip 36 is relatively easily embedded in the work so as to prevent the screw from moving laterally from the desired point of application, an operational undesirable occurrence generally referred to as "wandering". The cutting edges 38 and 40 engate the workpiece and form an aperture therein having the diameter similar to that of the drilling portion 14 of the screw. As the screw passes into the aperture, the thread forming screw convolutions rapidly form a thread into which the full depth convolutions 20 may secure the fastener in the workpiece.

The drilling portion need not have side extremity surfaces 28a and 28b arranged in parallelism but the leading end of the drill portion may be larger than the portion that follows. Various configurations of drilling screw points or portions are known and the application of the drilling surfaces formed as described herein may be applied to the known shapes and configurations.

I claim:

1. In a drill and thread forming screw having a head portion, a shank portion with an outstanding thread thereon, a longitudinal axis, and a formed metal drilling portion centered on the axis at the end of the shank having side extremity surfaces and drill-like end surfaces, the improvement wherein said drilling portion comprises:

metal cutting means having at least two cutting edges each extending uninterruptedly from a side extremity surface of the drilling portion to the longitudinal axis, said cutting edges meeting each other at said axis providing continuous cutting means from one side extremity surface through the axis to an opposite side extremity surface of the drilling portion;

formed metal means supporting the cutting edges for drilling purposes and including an exposed surface extending generally longitudinally from each cutting edge to the shank portion;

a pair of rounded surfaces each extending from a side extremity surface around the drilling portion to end abruptly at an exposed surface forming a pair of longitudinal extending pockets with said exposed surfaces along which chips may egress, each pocket having means adjacent to the cutting edge providing a relatively abrupt change in direction for breaking chips into small pieces.

2. In a drill and thread forming screw having a head portion, a shank portion with an outstanding thread thereon, a longitudinal axis, and a formed metal drilling portion centered on the axis at the end of the shank having side extremity surfaces and drill-like end surfaces, the improvement wherein said drilling portion comprises:

metal cutting means having at least two cutting edges each extending uninterruptedly from a side extremity surface of the drilling portion to the longitudinal axis, said cutting edges being the extremities of exposed surfaces and meeting each other at said axis providing continuous cutting means from one side extremity surface through the axis to an opposite side extremity surface of the drilling portion;

formed metal means in trailing position to said edges supporting each of the cutting edges along its entire extent for drilling purposes and including a solid mass of metal shaped generally as a pair of longitudinal, offset half cylinders one for each cutting edge, each surmounted at the end by a section of an oblique cone, the cutting edge being an element of the surface of the cone section, the cylindrical axis of each half cylinder being radially displaced from said longitudinal axis.

3. The screw of claim 2 wherein the apex of each cone section is centered on the longitudinal axis of the screw.

4. In a drill and thread forming screw having a head portion, a shank portion with an outstanding thread thereon, a longitudinal axis, and a formed metal drilling portion centered on the axis at the end of the shank having side extremity surfaces and drill-like end surfaces, the improvement wherein said drilling portion comprises:

metal cutting means having at least two cutting edges each extending uninterruptedly from a side extremity surface of the drilling portion to the longitudinal axis forming together a pointed drilling end with an apex on said axis, said cutting edges being the extremities of exposed surfaces and meeting each other directly at said axis providing continuous cutting means from one side extremity surface through the axis to an opposite side extremity surface of the drilling portion; and formed metal means in trailing position to said edges supporting each of the cutting edges along its entire extent for drilling purposes, said formed metal means having a curved outer surface extending abruptly away from said exposed surface at generally a right angle and curling outwardly to said side extremity.

5. In a drill and thread forming screw having a head portion, a shank portion with an outstanding thread thereon, a longitudinal axis, and a formed metal drilling portion centered on the axis at the end of the shank having side extremity surfaces and drill-like end surfaces, the improvement wherein said drilling portion comprises:

metal cutting means having at least two cutting edges each extending uninterruptedly from a side extremity surface of the drilling portion to the longitudinal axis, said cutting edges being the extremities of exposed surfaces and meeting each other at said axis providing continuous cutting means from one side extremity surface through the axis to an opposite side extremity surface of the drilling portion;

formed metal means in trailing position to said edges supporting each of the cutting edges along its entire extent for drilling purposes and including a solid mass of metal behind each cutting edge, each such mass being generally shaped with a rounded outer surface curling from the side extremity to abrupt intersection with one of said exposed surfaces, said rounded surface extending over the length of the drilling portion and in generally conical form at the material entering end of the drilling portion with an apex of the conical form being on the axis of the fastener and the cutting edge being an element of the surface of such conical form, said mass of metal being positioned relative to the cutting edge of the opposite exposed surface exposing such edge from the side extremity continuously to said longitudinal axis.

6. In a drill and thread forming screw as defined in claim 5 wherein the rounded outer surface of the metal mass behind each cutting edge has an involute shape viewed in section taken normal to the axis of the fastener.

7. In a drill and thread forming screw as defined in claim 5 wherein the material entering end of the drilling portion is relatively blunt with the included angle between the two cutting edges extending across such end being between 120° and 160°.

* * * * *